United States Patent
Ferris et al.

(10) Patent No.: US 6,708,918 B2
(45) Date of Patent: Mar. 23, 2004

(54) CABLE GUIDING FINS

(75) Inventors: Mathew D. Ferris, Chaska, MN (US); Joel T. Fisher, South St. Paul, MN (US); Alex D. Watts, Minnetonka, MN (US)

(73) Assignee: ADC Telecommunications, Inc., Minnetonka, MN (US)

(*) Notice: Subject to any disclaimer, the term of this patent is extended or adjusted under 35 U.S.C. 154(b) by 0 days.

(21) Appl. No.: 09/797,299

(22) Filed: Mar. 1, 2001

(65) Prior Publication Data

US 2002/0121571 A1 Sep. 5, 2002

(51) Int. Cl.[7] .......................... B65H 57/02; G02B 6/00; H02G 3/04; F16L 3/22
(52) U.S. Cl. ..................... 242/615; 248/68.1; 385/135; 174/97
(58) Field of Search .......................... 242/615, 615.1, 242/615.21, 397, 397.1, 400.1; 248/65–74.5; 385/134, 135, 136, 137; 174/97

(56) References Cited

U.S. PATENT DOCUMENTS

| | | | |
|---|---|---|---|
| 3,351,699 A | 11/1967 | Merckle | |
| 4,372,511 A | * 2/1983 | Knowles | 248/68.1 |
| 5,066,149 A | * 11/1991 | Wheeler et al. | 385/135 |
| 5,067,678 A | 11/1991 | Henneberger et al. | |
| 5,160,811 A | 11/1992 | Ritzmann | |
| 5,161,580 A | 11/1992 | Klug | |
| 5,240,209 A | 8/1993 | Kutsch | |
| 5,271,585 A | 12/1993 | Zetena, Jr. | |
| 5,316,243 A | 5/1994 | Henneberger | |
| 5,316,244 A | 5/1994 | Zetena, Jr. | |
| 5,335,349 A | 8/1994 | Kutsch et al. | |
| 5,339,379 A | * 8/1994 | Kutsch et al. | 385/135 |
| 5,427,339 A | * 6/1995 | Pauli et al. | 242/615 |
| 5,503,354 A | 4/1996 | Lohf et al. | |
| 5,746,389 A | * 5/1998 | Willmann | 242/615.1 |
| 5,752,781 A | 5/1998 | Haataja et al. | |
| 5,923,753 A | 7/1999 | Haataja et al. | |
| 5,937,131 A | 8/1999 | Haataja et al. | |
| 5,988,570 A | * 11/1999 | Gretz | 248/68.1 |
| 5,995,699 A | 11/1999 | Vargas et al. | |
| 6,002,089 A | * 12/1999 | Hemingway et al. | 174/97 |
| 6,037,538 A | 3/2000 | Brooks | |
| 6,076,779 A | 6/2000 | Johnson | |
| 6,192,181 B1 | * 2/2001 | Haataja et al. | 385/134 |
| 6,263,141 B1 | * 7/2001 | Smith | 385/135 |
| D446,505 S | * 8/2001 | Wakileh et al. | D13/155 |
| 6,289,159 B1 | * 9/2001 | Hees et al. | 385/134 |
| 6,388,193 B2 | * 5/2002 | Maynard et al. | 385/134 |
| 2002/0039476 A1 | * 4/2002 | Sauve et al. | 385/134 |

FOREIGN PATENT DOCUMENTS

WO    WO 00/67052    11/2000

OTHER PUBLICATIONS

ADC Telecommunications brochure entitled "FiberGuide® Fiber Management Systems," 33 pages, dated Oct., 1995.
Warren & Brown & Staff brochure pages entitled "light-paths," Issue 2, 11 pages, dated 1995.
ADC Telecommunications brochure entitled "Fiber Guide™ Fiber Management System," 6 pages, dated Jun., 1989.
ADC Telecommunications brochure entitled "ADC Fiber-Guide® System Express Exit™ 2×2," 2 pages, dated 5/99.
ADC Telecommunications brochure entitled "FiberGuide® Fiber Management Systems," 37 pages, dated 6/98.
ADC Telecommunications catalog entitled "Fiber Panel Products," Second Edition, dated 7/96.

* cited by examiner

Primary Examiner—John M. Jillions
(74) Attorney, Agent, or Firm—Merchant & Gould P.C.

(57) ABSTRACT

A cable guiding fin for managing cable in a cable management system. The fin includes a base and an upstanding wall with a convex surface. The upstanding wall may be tilted at an angle relative to the base and may define a plurality of tie-down apertures. The base may include an adhesive or fastener holes to secure the base to a surface of the cable management system.

30 Claims, 6 Drawing Sheets

CABLE GUIDING FINS

FIELD OF THE INVENTION

The invention pertains to systems for the management and routing of optical fiber cables.

BACKGROUND OF THE INVENTION

In the telecommunications industry, the use of optical fibers for signal transmission is accelerating. With the increased utilization of optical fiber systems, optical fiber cable management requires industry attention.

One area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly a routing system is not practical which would require a high capital outlay and which could not be readily adapted to changes in a customer's needs. Namely, if routing paths, once established, are forever fixed, the system cannot adapt. Also, and perhaps most important, any routing system must protect optical fibers from damage. In the use of optical fibers, it is recognized that the fibers should not bend beyond a minimum radius of curvature. For example, it is commonly recognized that optical fibers should not be bent in a radius of less than 1.5 inches.

Current cable management systems typically comprise cable troughs having a base and sidewalls. Where the trough turns or bends, the cables tend to bunch adjacent a sidewall of the system. When this occurs, the cables may ride up along the sidewall and eventually may be pulled over the sidewall and escape the cable trough. Therefore, there exists a need for devices and methods to prevent cables from bunching and riding up along the system sidewalls and escaping the cable management system.

SUMMARY OF THE INVENTION

According to preferred embodiments of the present invention, a cable guiding fin is disclosed for managing optical fiber cables inside a cable management system. The cable guide fin includes a base and an upstanding wall. The base includes a generally planar bottom surface and supports the upstanding wall. The upstanding wall includes a convex surface. The bottom surface of the base may be received on a planar top surface of a cable management pathway.

In one preferred embodiment, the upstanding wall of the cable guide fin is at an angle relative to the bottom surface of the base.

In another preferred embodiment the base includes an adhesive on its bottom surface for securing the fin to the cable management pathway.

In an alternative embodiment the base defines fastener holes to allow fasteners to secure the fin to the cable management pathway.

In a further preferred embodiment, the upstanding wall includes a flange along a top edge of the upstanding wall.

In yet another preferred embodiment the upstanding wall defines a plurality of cable tie-down apertures for securing cables to the fin.

DETAILED DESCRIPTION OF THE PREFERRED EMBODIMENTS

Referring now to FIGS. 1–4, a cable guiding fin 100 according to the present invention is shown. Fin 100 includes a base 110 having a planar bottom surface 120. Fin 100 also includes upstanding wall 130. The upstanding wall 130 is supported by the base 110.

Figure 1:
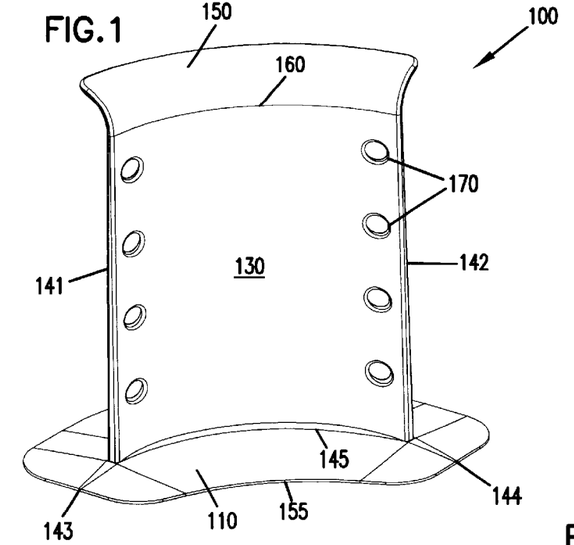
FIG. 1 shows a perspective view of a cable guiding fin according to the present invention.
Figures 2, 3:
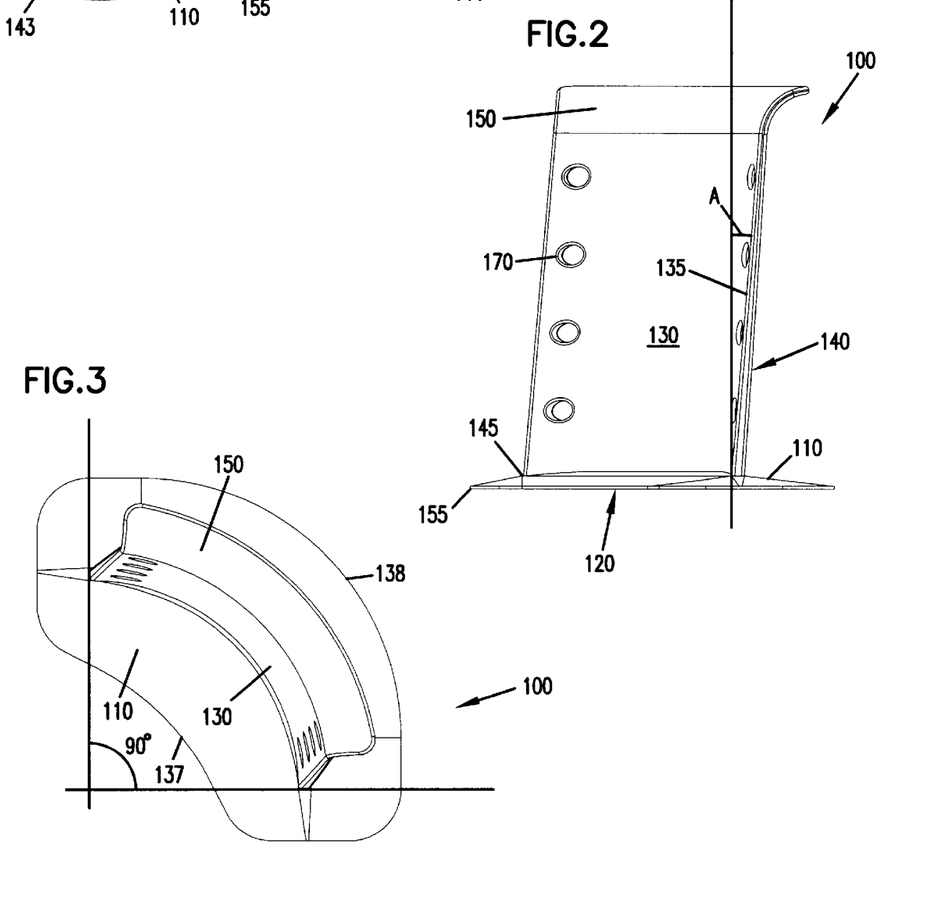
FIG. 2 is a side view of the cable guiding fin of FIG. 1.
FIG. 3 is a top view of the cable guiding fin of FIG. 1.
Figure 4:
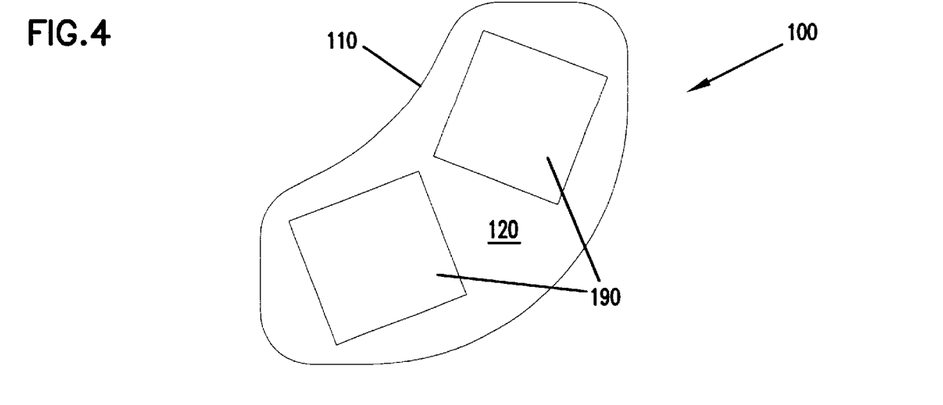
FIG. 4 is a bottom view of the cable guiding fin of FIG. 1.

The upstanding wall 130 has a convex surface 140. The convex surface is characterized by a radius of curvature that is equal to or preferably greater than the minimum bend radius of the fiber cable. This prevents damage to the cables or the signal carried by the cables due to excessive bending. As shown in FIG. 3, the upstanding wall may extend through a 90 degree arc (quarter circle). Alternatively, the upstanding wall may pass through a 45 degree arc or other arc as desired, as long as the upstanding wall maintains a radius of curvature greater than or equal to the minimum bend radius of the cables. For instance, the upstanding wall may pass through an angle between and including 0 degrees (straight) and 180 degrees (semicircle). The upstanding wall 130 shown in the Figures also includes a concave surface 135, opposite the convex surface 140.

The upstanding wall 130 is preferably set at an angle relative to the base 110. The angle may be any angle between 90 and 75 degrees relative to the base, or in other words, 0 and 15 degrees relative to a perpendicular of the base. As shown in FIGS. 2 and 3, the upstanding wall 130 is tilted (depicted as angle A) 5 degrees. Angling the upstanding wall 130, discourages the cables from riding up along the upstanding wall 130. Furthermore, the upstanding wall 130 may include a flange 150 along an upper edge 160. The flange projects in the same direction faced by the convex surface. The flange 150 aids in preventing cables from being pulled over the upstanding wall 130.

Figure 7:
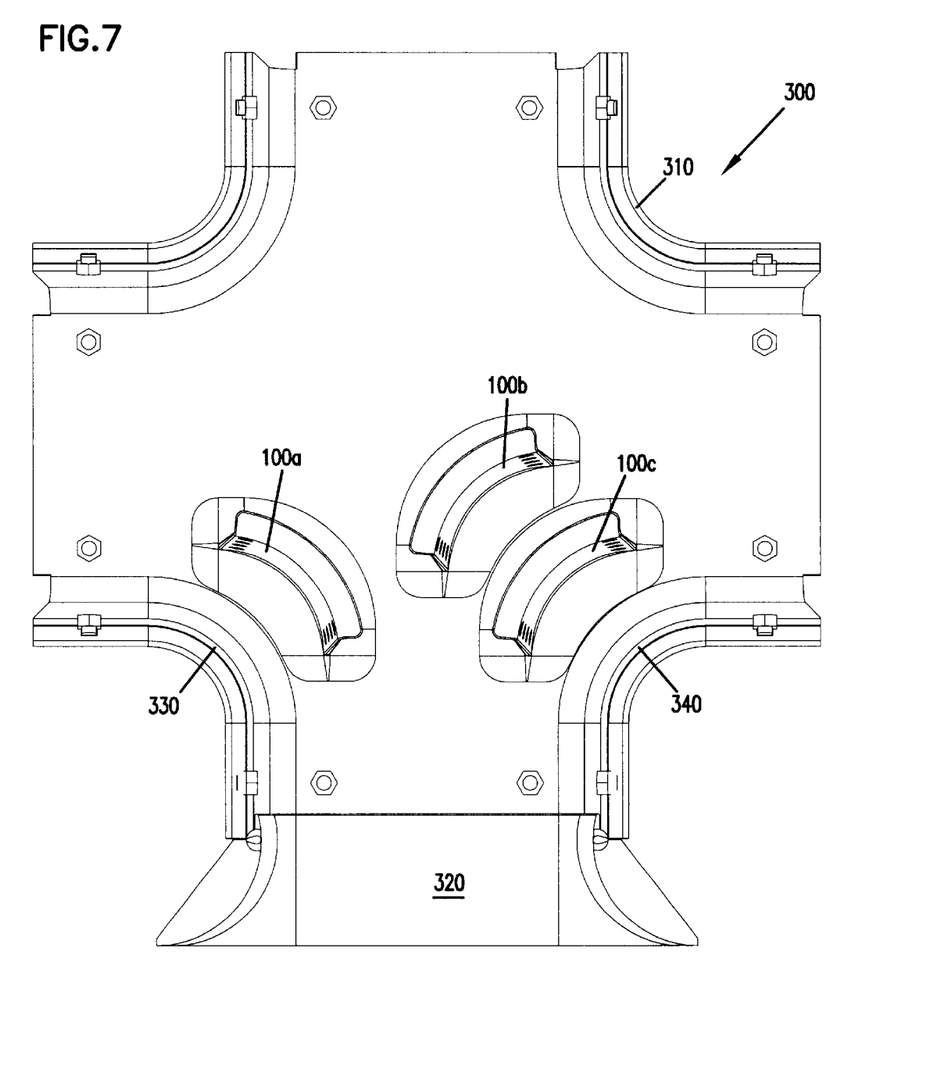
FIG. 7 is a top view of a cable management system having a cable exit downspout and having three cable guiding fins according to the present invention inserted.

In the preferred embodiment, upstanding wall 130 is spaced from inside edge 137 and outside edge 138 of base 110. As shown, inside edge 137 and outside edge 138 are curved. Preferably, side edges 141 and 142 of upstanding wall 130 are spaced inward from end edges 143 and 144 of base 110. The curved inside and outside edges 137 and 138 allow fins to be nested in close proximity as is shown in FIG. 7 (fins 100b and 100c).

Base 110 is tapered from point 145 where the upstanding wall 130 is supported by the base 110 to an outer edge 155 of the base 110. Tapering the base 110 avoids sharp edges which may damage fiber optic cables. The base 110 extends in directions perpendicular to both the convex surface 140 and the concave surface 135 of the upstanding wall 130, thereby supporting the upstanding wall on two sides.

Figure 6:
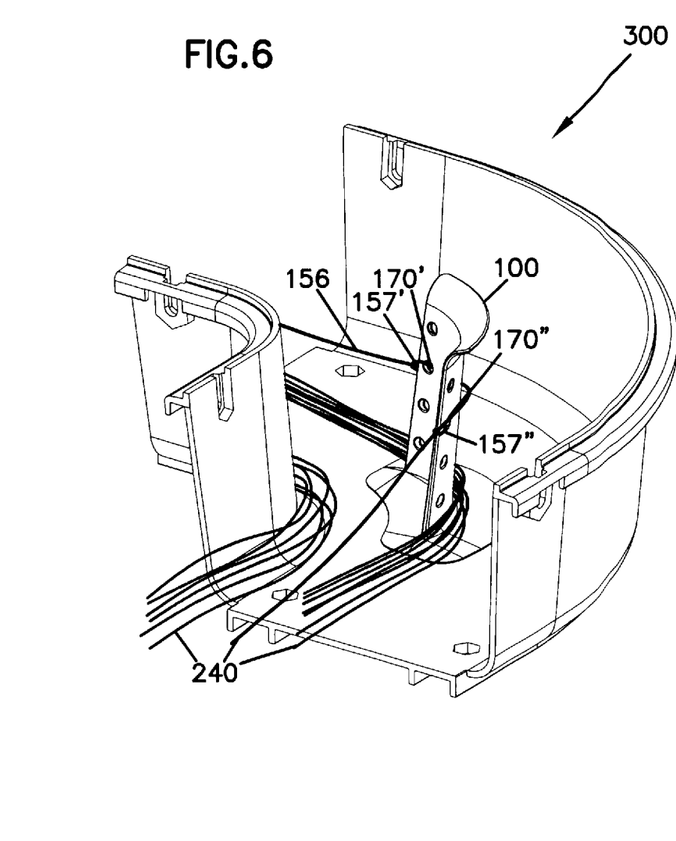
FIG. 6 is a perspective view of the cable management system of FIG. 5 with a cable guiding fin according to the present invention inserted.

The fin 100 may also define cable tie-down apertures 170. The apertures 170 allow cables to be secured to the upstanding wall 130 of the fin 100 using cable ties. FIG. 6 shows a cable 156 secured to cable tie-down apertures 170' and 170" of fin 100 by means of cable ties 157' and 157".

Figure 5:
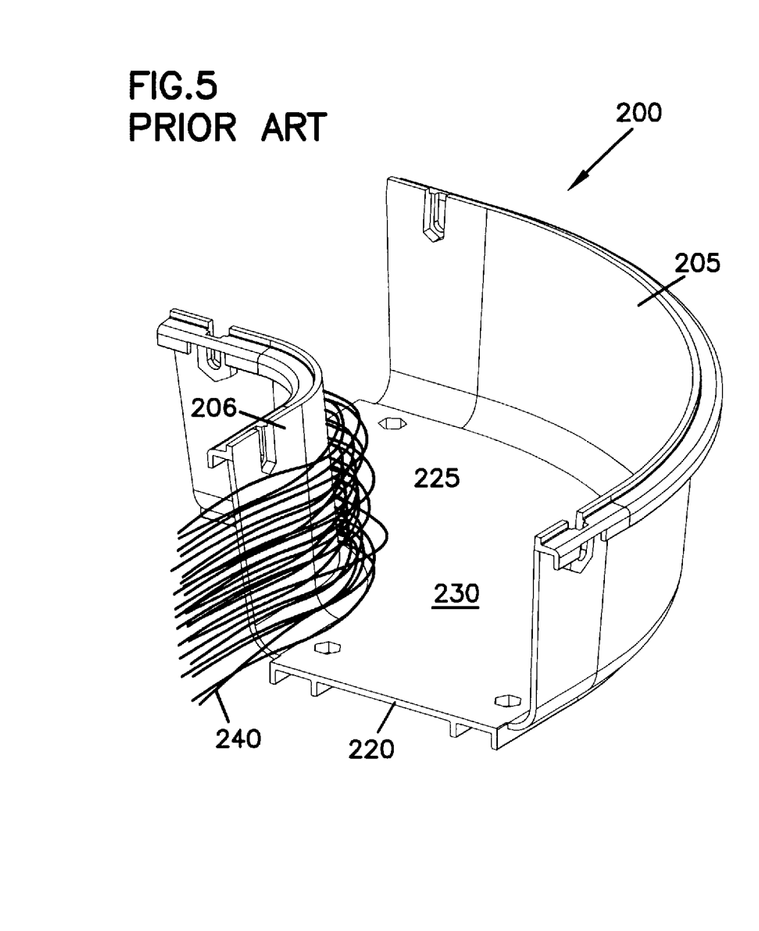
FIG. 5 is a perspective view of a 90 degree bend in a typical cable management system.

FIG. 5 shows a typical prior art 90 degree trough cable management system 200. The cable management system 200 includes sidewalls 205 and 206 and a base element 220 with a planar top surface 230. The sidewalls 205 and 206 with the base element 220 define a cable pathway 225. Sidewall 206 has a convexly curved shape. Due to pulling forces on remote ends of the cables, the cables tend to bunch up adjacent the sidewall 206. The paths 240 of the cables are tangled together and do not utilize the full space of the pathway 225. Pulling forces at remote ends of the cables may also cause the cables to creep up the sidewall 206 and can eventually pull the cables over the sidewall 206 and out of the cable management system 200.

FIG. 6 shows a cable management system which is identical to system 200 only a cable guiding fin 100 according to the present invention has been inserted. The cable paths 240 in FIG. 6 utilize more of the cable pathway 225, decreasing the bunching adjacent sidewall 206.

Figure 10:
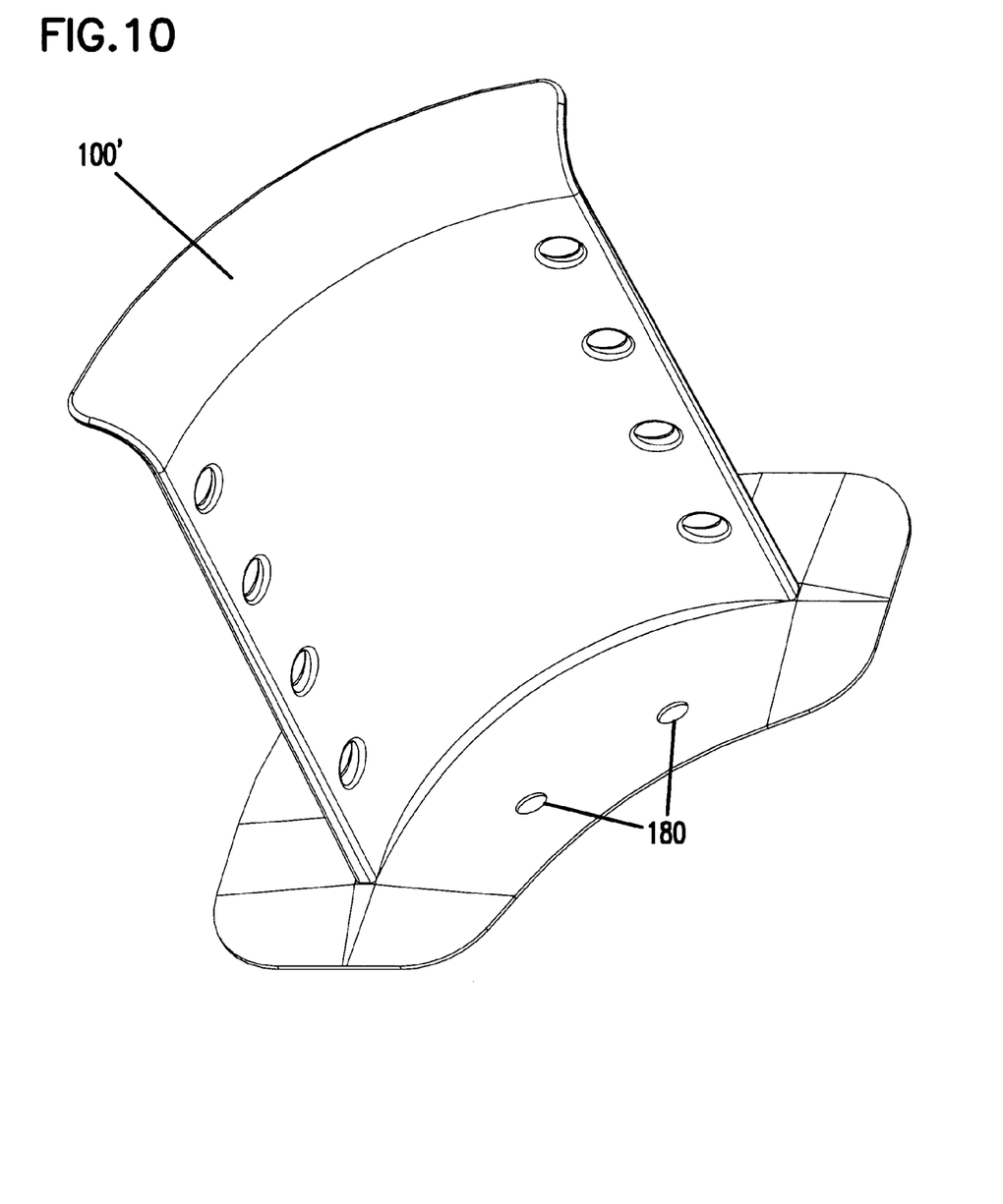
FIG. 10 is a perspective view of an alternative embodiment of the present invention incorporating fastener holes in the base of the cable guiding fin.

A significant advantage of the cable guiding fin 100 of the present invention, is that it can be inserted easily into existing cable management systems, effectively retrofitting the existing system. The fin 100 may be secured to any desired flat surface. Fin 100 may include an adhesive 190 on the planar bottom surface 120 of the base 110. The adhesive 190 might be peel and stick adhesive pads, for instance. Alternatively, the base may define fastener holes 180 as shown in FIG. 10. Fasteners such as screws could be received through the fastener holes to secure the fin 100' to the cable management system.

Fins 100 can be added to the existing system in the desired location as cable management problems arise, or the fins can be added during initial system setup.

Figure 8:
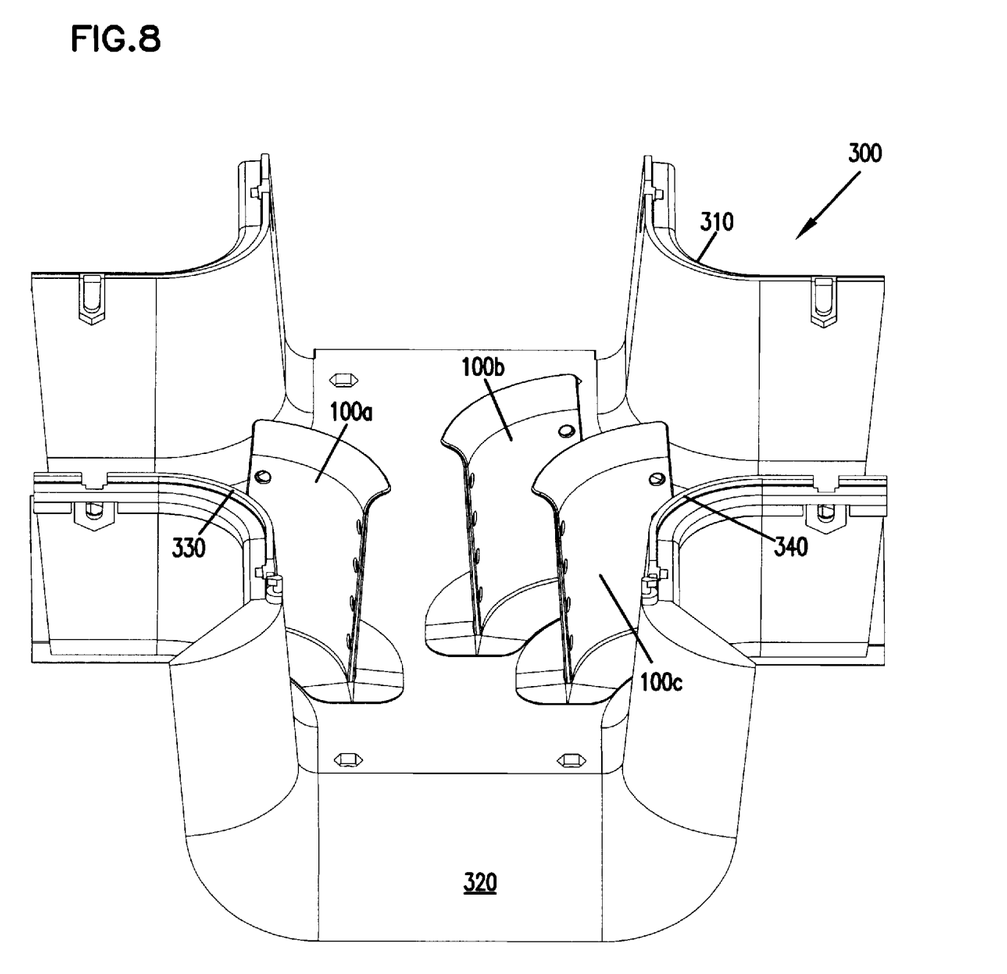
FIG. 8 is a first perspective view of the system of FIG. 7.
Figure 9:
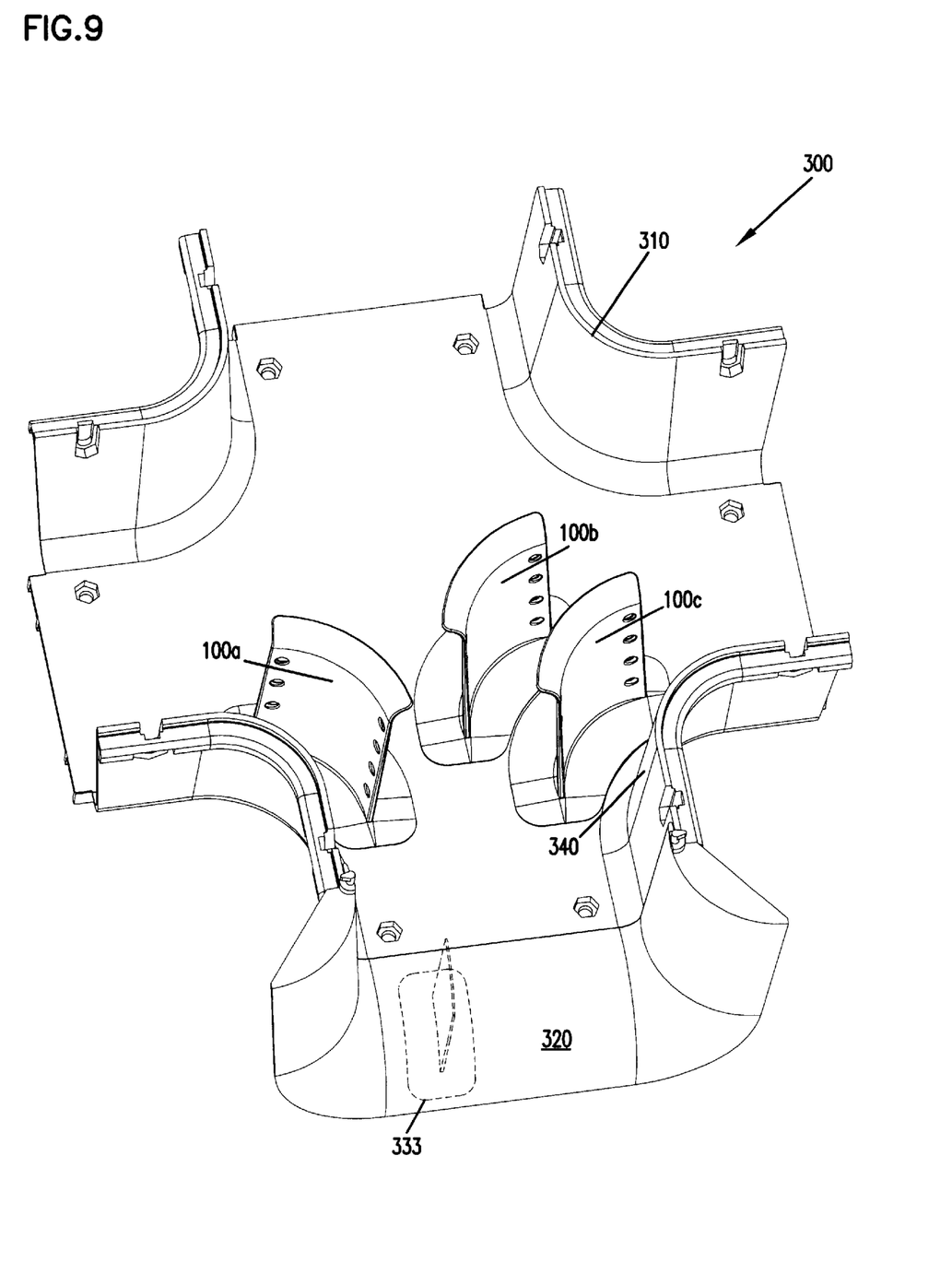
FIG. 9 is a second perspective view of the system of FIG. 7.

Using fins according to the present invention, many customized arrangements can be achieved. FIGS. 7–9 show how multiple fins could be inserted into a cable management system 300. A crossing trough 310 includes downspout exit or trumpet flare 320. The downspout exit 320 allows cables to pass from the cable crossing trough 310 to other system components located beneath the cable management system 300. Because the system components may be located several feet below the cable management system 300, the weight of the cables hanging from the downspout exit can exert a substantial pulling force on the lengths of cable inside the cable trough 310. This may result in cables bunching and creeping up the sides of walls 330 and 340 in a manner similar to that described in FIG. 5. To prevent this undesirable result, a plurality of cable guiding fins 100a, 100b, and 100c have been inserted into the system 300. The fins 100a–c guide and separate the cables through the 90 degree turn and prevent excessive bunching at walls 330 and 340.

Alternatively the base of the cable guiding fin may be formed to fit any surface of the cable management system. For instance, the base could be curved with a concave surface to fit the downspout exit 320 as shown by fin 333 in FIG. 9 The base could also be curved to fit walls 330 or 340 in order to secure fins horizontally in the cable management system. A wide variety of insertable fins could be formed with bases conformed to fit various flat or curved surfaces.

The upstanding wall supported by the base could be configured as a straight wall or a curved wall. Thus, the present invention may be practiced to retrofit almost any existing cable management system with additional cable guiding and organizing fins.

Guiding fins according to the present invention may be secured to an existing cable management system in which cables are already present. Upon securing the fin to the system, cables may be lifted over the fin so that the fin organizes and guides the selected cables.

Having described the present invention in its preferred embodiment, modifications and equivalents may occur to one skilled in the art. It is intended that such modifications and equivalents shall be included within the scope of the claims which are appended hereto.

What is claimed is:

1. A cable guiding fin for managing cables in a cable management pathway, the pathway being defined by at least one planar surface, the fin comprising:

a base having a first side and a second side, the first side being planar;

an upstanding wall supported by the second side of the base, the upstanding wall having a convex surface, the upstanding wall being tilted at an angle relative to the base toward a direction faced by the convex surface;

wherein the first side of the base may be received on the planar surface that defines the cable management pathway.

2. The cable guiding fin of claim 1 wherein the angle is between 0 and 15 degrees from perpendicular.

3. The cable guiding fin of claim 2 wherein the angle is 5 degrees.

4. The cable guiding fin of claim 1 wherein the upstanding wall includes a flange extending in a direction faced by the convex surface from an end of the upstanding wall opposite the base.

5. The cable guiding fin of claim 1 wherein the convex surface of the upstanding wall extends through a 90 degree arc.

6. The cable guiding fin of claim 1 wherein the convex surface of the upstanding wall extends through a 45 degree arc.

7. The cable guiding fin of claim 1 wherein the convex surface of the upstanding wall extends through an arc of between 20 and 100 degrees.

8. The cable guiding fin of claim 1 wherein the upstanding wall defines at least one cable tie-down aperture.

9. The cable guiding fin of claim 1 wherein the upstanding wall includes first and second ends and further wherein the upstanding wall defines a plurality of cable tie-down apertures proximate the ends of the upstanding wall.

10. The cable guiding fin of claim 1 wherein the first side of the base includes an adhesive for securing the fin to the planar surface.

11. The cable guiding fin of claim 1 wherein the base defines a plurality of fastener holes.

12. A cable guiding fin for managing cables in a cable management pathway, the pathway being defined by at least one planar surface, the fin comprising:

an arcuately shaped base having a first side and a second side, the first side being planar;

an upstanding wall supported by the second side of the base, the upstanding wall having a convex surface;

wherein the first side of the base may be received on the planar surface that defines the cable management pathway;

wherein the upstanding wall is at an angle of between 0 and 15 degrees relative to the first side of the base, and wherein the upstanding wall includes a flange extending in a direction faced by the convex surface from an end of the upstanding wall opposite the base, and wherein the upstanding wall defines at least one cable tie-down aperture.

13. The cable guiding fin of claim 12 wherein the first side of the base includes an adhesive for securing the fin to the planar surface.

14. The cable guiding fin of claim 12 wherein the base defines a plurality of fastener holes.

15. A cable management assembly comprising:

a cable trough having a first planar surface, a first exterior wall, and a second exterior wall, each of the first and second exterior walls adjoining the first planar surface;

a cable guiding fin positioned within the cable trough and including;
  a base with a first side and a second side;
  an upstanding wall supported by the second side of the base, the upstanding wall including a first wall surface oriented parallel to the first exterior wall of the cable trough and an opposite second wall surface oriented parallel to the second exterior wall of the cable trough, the upstanding wall defining:
    a first interior cable pathway between the first wall surface and the first exterior wall of the cable trough; and
    a second interior cable pathway between the second wall surface and the second exterior wall of the cable trough;
  wherein the first side of the base is received on and supported by only the planar surface of the cable trough.

16. The cable management assembly of claim 15 wherein the upstanding wall includes a convex surface.

17. The cable management assembly of claim 15 wherein the upstanding wall is generally centrally located between the first wall and the second wall of the cable trough.

18. A cable management assembly comprising:

a base element having a first surface;

a cable guiding fin including:
  a base with a first side and a second side;
  an upstanding wall having a length, the upstanding wall being supported by the second side of the base along the entire length of the upstanding wall, the upstanding wall including a convex surface;
wherein the first side of the base is received on the surface of the base element; and a sidewall coupled to the base element, the sidewall having a convex surface, wherein the cable guiding fin is oriented on the base element so that the convex surface of the sidewall and the convex surface of the upstanding wall face in the same direction.

19. A cable management assembly comprising:

a base element having a first surface;

a cable guiding fin including:
  a base with a first side and a second side;
  an upstanding wall supported by the second side of the base;
wherein the first side of the base is received on the surface of the base element; and
  wherein the base element has a convex surface, and wherein the base of the fin includes a corresponding concave surface received on the convex surface of the base element.

20. A cable management assembly comprising:

a cable pathway having a first surface and sidewalls, the first surface and sidewalls defining a curved cable trough;

a cable guiding fin positioned within the curved cable trough, the cable guiding fin including:
  a base with a first side and a second side;
  an upstanding wall supported by the second side of the base;
wherein the first side of the base is received on the first surface of the curved cable trough; and
wherein the upstanding wall is at an angle of between 0 and 15 degrees relative to the first side of the base, and wherein the upstanding wall includes a flange extending from an edge of the upstanding wall, and wherein the upstanding wall defines at least one cable tie-down aperture.

21. A method of assembling a cable management system comprising the steps of:

providing a cable support element having at least one sidewall and a base element, the base element having a top convex surface portion;

providing a cable guiding fin including a base with a bottom concave surface; the fin also including an upstanding wall supported by the base, the upstanding wall having a convex surface;

securing the bottom concave surface of the base of the cable guiding fin to only the top convex surface of the cable support element; and placing cables adjacent the convex surface of the upstanding wall of the cable guiding fin.

22. A method of assembling a cable management system comprising the steps of:

providing a cable management system including a trough having a base element with a top surface and at least one sidewall;

providing a cable guiding fin including a base with a bottom surface; the fin also including an upstanding wall supported by the base, the upstanding wall defining a first side and a second side relative to the upstanding wall, the cable management system including a plurality of cables positioned between the sidewall of the trough and the first side of the upstanding wall;

securing the base of the cable guiding fin to only the top surface of the cable management system so that a plurality of cables are on the first side relative to the upstanding wall; and separating at least one cable from the remaining plurality of cables by lifting the at least one cable from the first side, over the upstanding wall, and placing the at least one cable on the second side relative to the upstanding wall.

23. The method of claim 22 wherein the upstanding wall defines a cable tie-down aperture and further comprising the step of tying a cable to the cable guiding fin by inserting a cable tie through a cable tie-down aperture.

24. The method of claim 22 wherein the upstanding wall is positioned within the trough to define a first trough region and a second trough region, the step of separating at least one cable from the remaining plurality of cables by lifting the at least one cable from the first side, over the upstanding wall, and placing the at least one cable on the second side relative to the upstanding wall, including positioning the at least one cable in the second trough region while the remainder of cables remain in the first trough region.

25. A cable guiding assembly for managing cables, the assembly comprising:
   a cable management trough having at least one planar surface, the trough defining a cable pathway, the cable pathway being defined at least in part by the planar surface,
   a cable guiding fin positioned within the cable pathway, the fin having a base and an upstanding wall, the base having a first side and a second side, the first side being planar wherein the first side can be received on the planar surface, the upstanding wall having a convex surface tilted at an angle relative to the base toward a direction faced by the convex surface; and
   a telecommunications cable routed along the convex surface of the upstanding wall.

26. The cable guiding assembly of claim 25 wherein the upstanding wall includes a flange extending in a direction faced by the convex surface.

27. The cable guiding assembly of claim 26 wherein the upstanding wall defines at least one cable tie-down aperture.

28. A cable guiding fin for managing cables in a cable management pathway, the pathway being defined by at least one planar surface, the fin comprising:
   a base having a first side and a second side, the first side including a planar portion capable of being received on the planar surface, wherein the fin may be supported by only the planar surface; and
   an upstanding wall supported by the second side of the base, the upstanding wall having a convex surface, the upstanding wall including a flange extending in a direction faced by the convex surface, the flange being located a uniform height above the base.

29. The cable guiding fin of claim 28 wherein the upstanding wall defines at least one cable tie-down aperture.

30. A method of assembling a cable management system comprising the steps of:
   providing a cable support element having at least one sidewall and a base element, the base element having a top surface;
   providing a cable guiding fin including a base with a bottom surface; the fin also including an upstanding wall supported by the base, the upstanding wall having a convex surface tilted at an angle relative to the base toward a direction faced by the convex surface;
   securing the base of the cable guiding fin to only the top surface of the cable support element; and
   placing cables adjacent the convex surface of the upstanding wall of the cable guiding fin.

* * * * *